(12) United States Patent
Kawasaki

(10) Patent No.: US 8,760,757 B2
(45) Date of Patent: Jun. 24, 2014

(54) INCIDENT-LIGHT FLUORESCENT ILLUMINATION DEVICE AND FLUORESCENT MICROSCOPE USING THE DEVICE

(75) Inventor: Kenji Kawasaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 654 days.

(21) Appl. No.: 13/048,443

(22) Filed: Mar. 15, 2011

(65) Prior Publication Data

US 2011/0235170 A1    Sep. 29, 2011

(30) Foreign Application Priority Data

Mar. 29, 2010  (JP) .................................. 2010-075603

(51) Int. Cl.
*G02B 21/06* (2006.01)
(52) U.S. Cl.
USPC ........................................... 359/385; 359/434
(58) Field of Classification Search
None
See application file for complete search history.

(56) References Cited

U.S. PATENT DOCUMENTS

| 6,985,288 | B2 * | 1/2006 | Miyashita et al. | 359/385 |
|---|---|---|---|---|
| 8,014,064 | B2 * | 9/2011 | Shimamoto | 359/385 |
| 2001/0005280 | A1 | 6/2001 | Ouchi | |
| 2009/0073695 | A1 | 3/2009 | Shimamoto | |
| 2009/0195866 | A1 | 8/2009 | Kawaski et al. | |
| 2009/0225412 | A1 * | 9/2009 | Mochida | 359/385 |
| 2009/0284833 | A1 | 11/2009 | Shimamoto | |
| 2010/0328765 | A1 * | 12/2010 | Dohi et al. | 359/385 |

FOREIGN PATENT DOCUMENTS

| GB | 2 379 280 A | 3/2003 |
|---|---|---|
| JP | 2005-283879 A | 10/2005 |
| JP | 2007-078571 A | 3/2007 |
| JP | 2009-069691 A | 4/2009 |
| JP | 2009-276544 A | 11/2009 |
| WO | 2008/047893 A1 | 4/2008 |

OTHER PUBLICATIONS

European Search Report dated Jun. 7, 2011 (in English) in counterpart European Application No. 11002101.1-2217.
Japanese Office Action dated Feb. 25, 2014 (and partial English translation thereof) in counterpart Japanese Application No. 2010-075603.

* cited by examiner

*Primary Examiner* — Arnel C Lavarias
(74) *Attorney, Agent, or Firm* — Holtz Holtz Goodman & Chick PC

(57) ABSTRACT

An incident-light fluorescent illumination device includes: a light source emitting illumination light; a collector lens receiving the illumination light from the light source; a fly-eye lens optical system receiving the illumination light from the collector lens; an objective emitting the illumination light to a sample surface; and a relay optical system arranged between the fly-eye lens optical system and the objective. The fly-eye lens optical system includes a first fly-eye lens surface and a second fly-eye lens surface each having a plurality of lens elements. The incident-light fluorescent illumination device satisfies the conditional expression of $$0.3 \leq D0/Lob \leq 0.75$$

where: $D0$ indicates the distance between a conjugate position with the second fly-eye lens surface through the relay optical system and a pupil position of the objective, and $Lob$ indicates a parfocalizing distance of the objective.

9 Claims, 15 Drawing Sheets

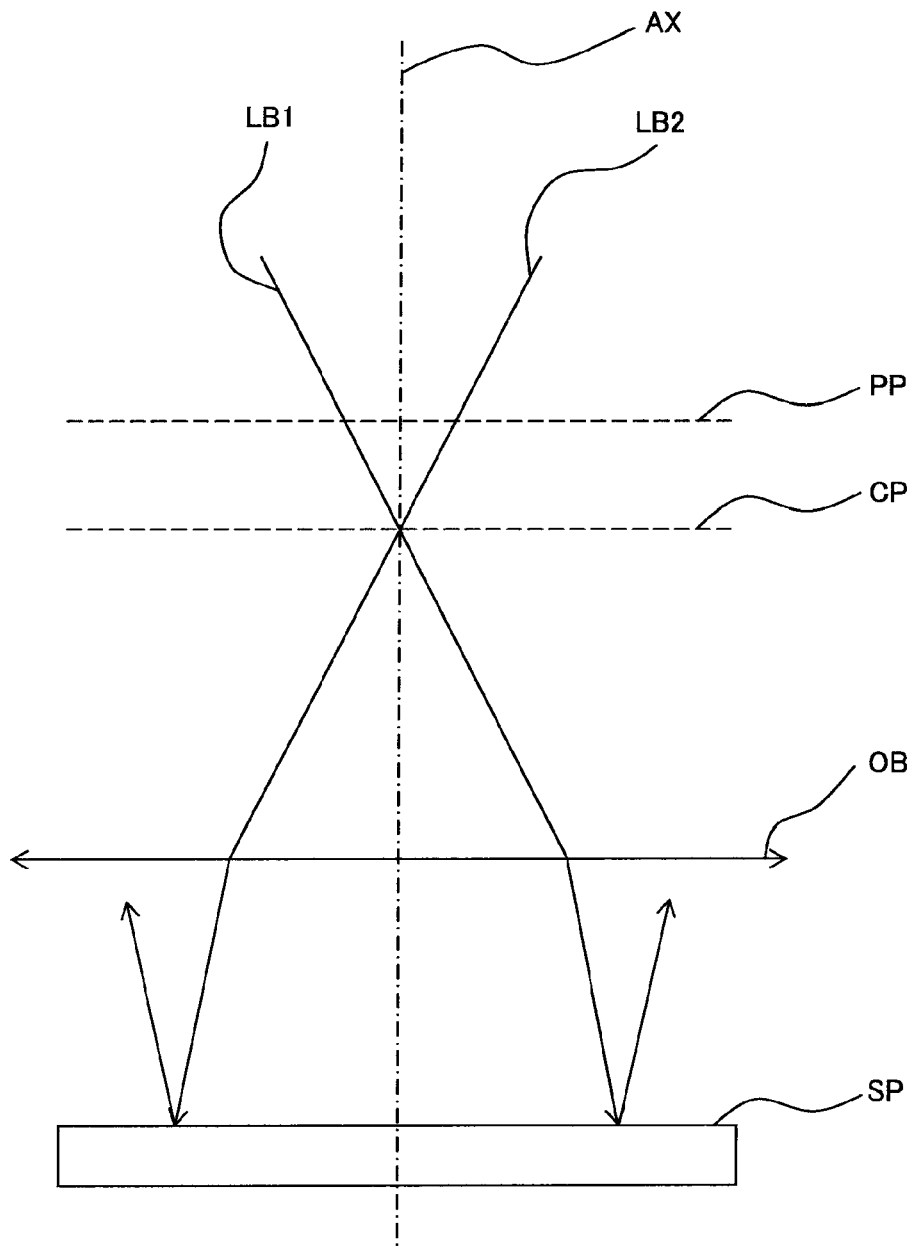
F I G. 2 B

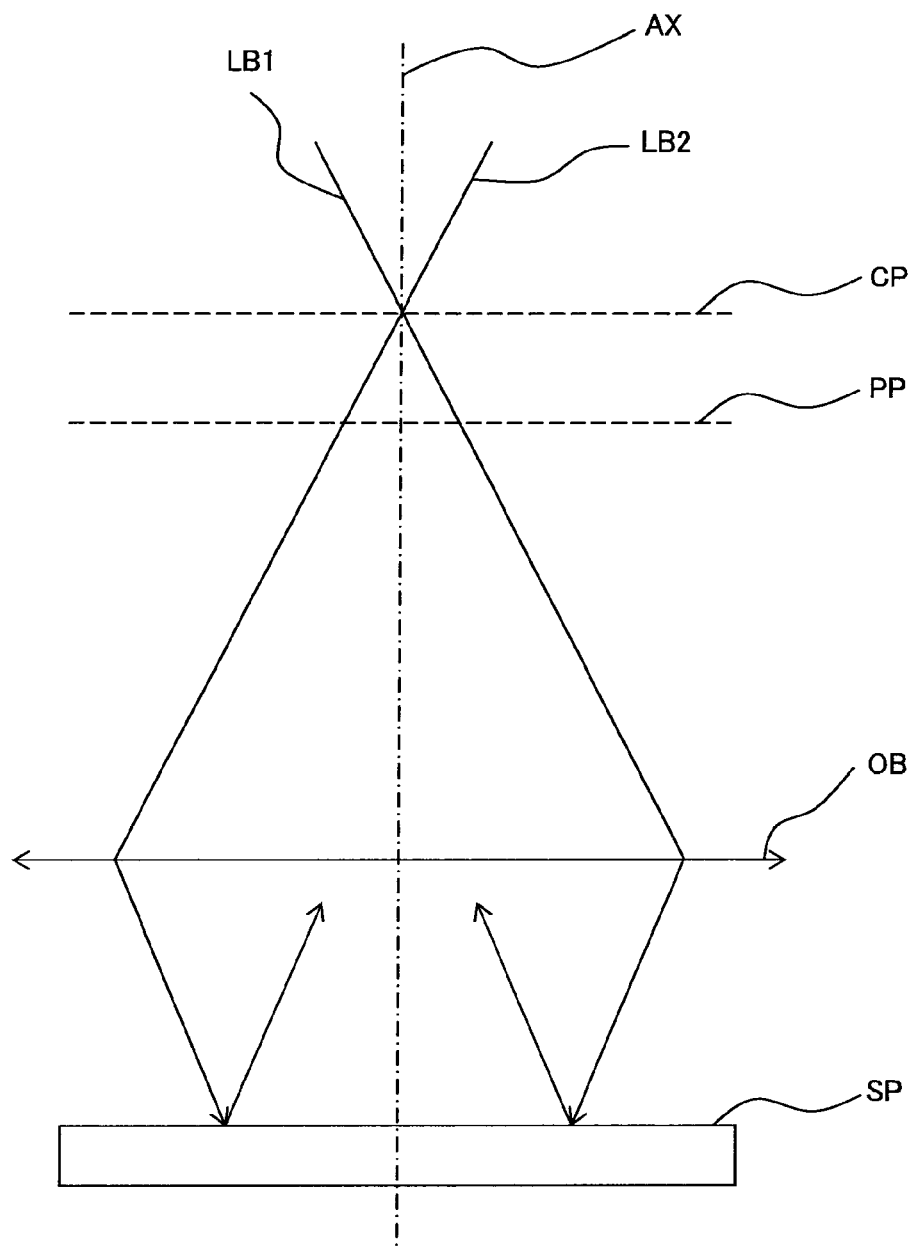
F I G. 2 C

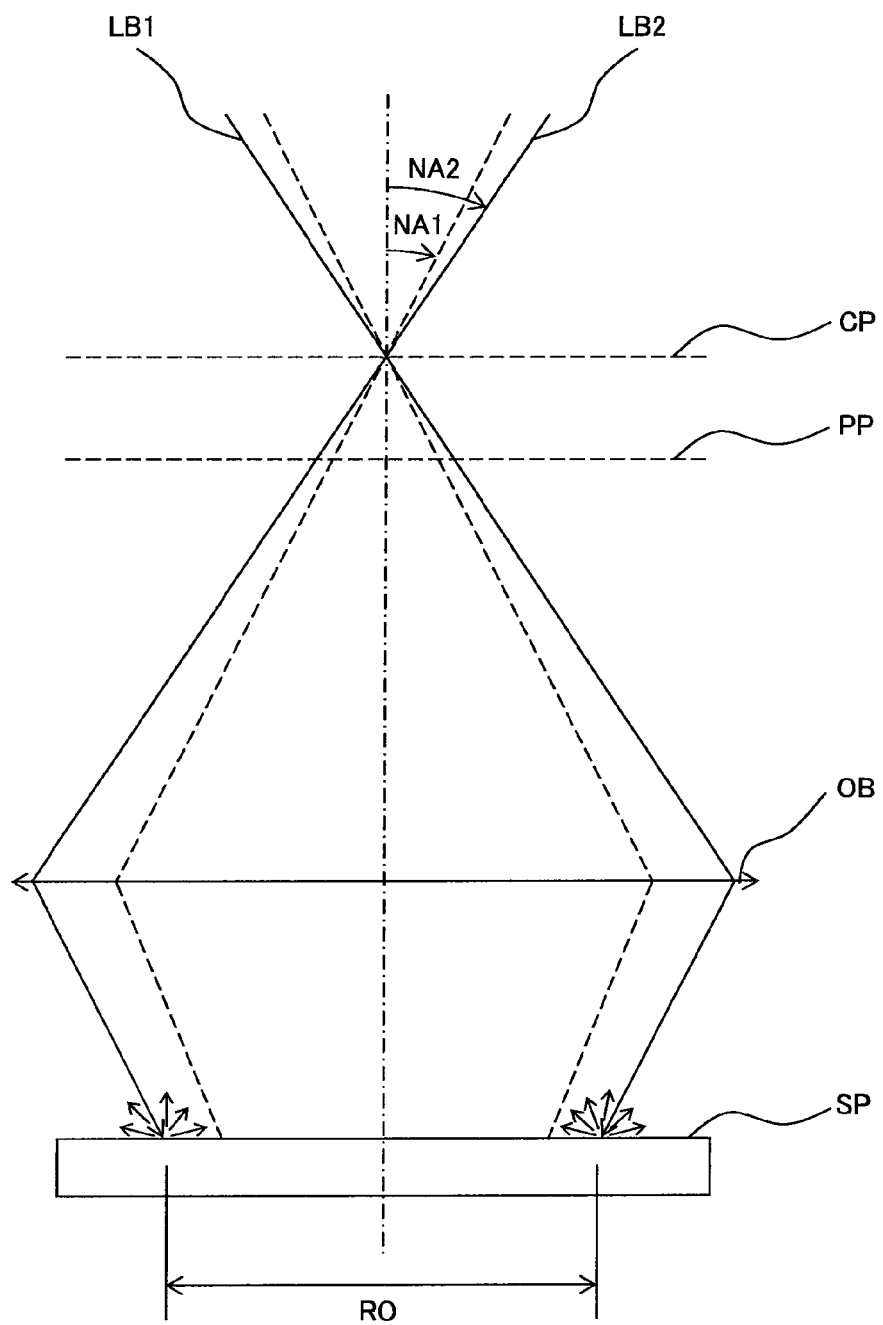
F I G. 3 B

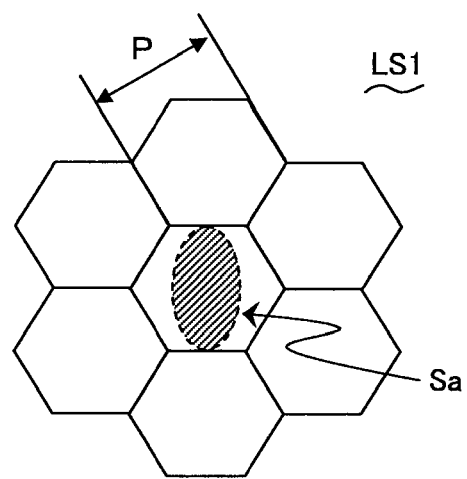
F I G. 6 A

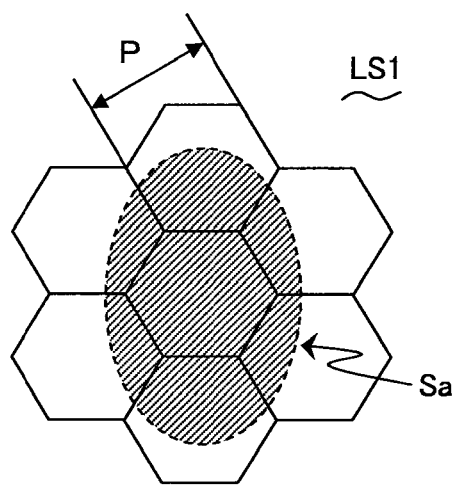
F I G. 7 A

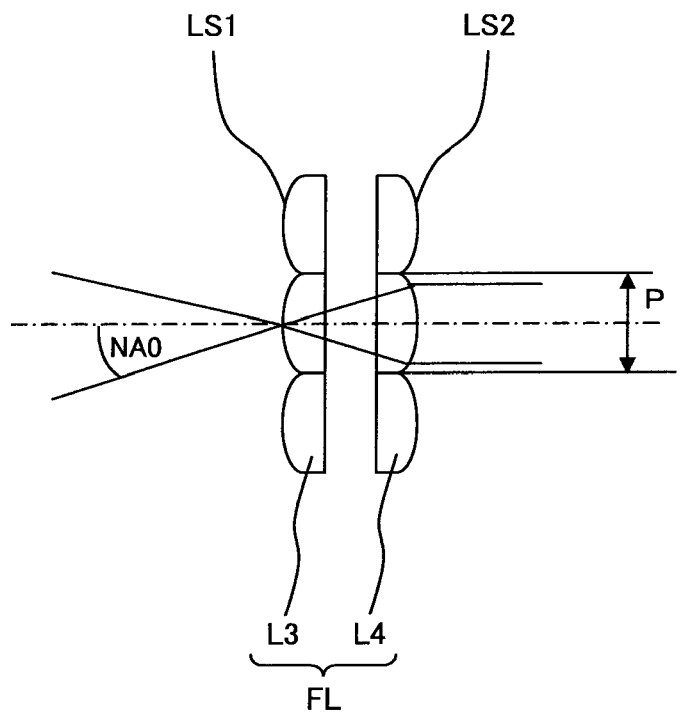
F I G. 8

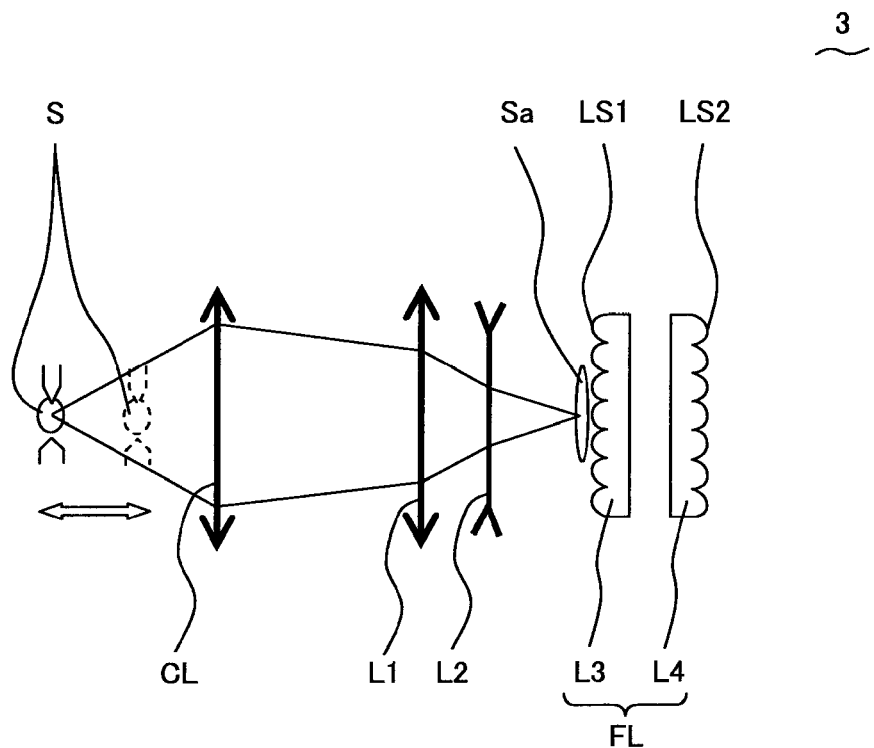
F I G. 9

INCIDENT-LIGHT FLUORESCENT ILLUMINATION DEVICE AND FLUORESCENT MICROSCOPE USING THE DEVICE

CROSS REFERENCE TO RELATED APPLICATIONS

This application is based upon and claims the benefit of priority from the prior Japanese Patent Application No. 2010-075603, filed Mar. 29, 2010, the entire contents of which are incorporated herein by this reference.

BACKGROUND OF THE INVENTION

1. Field of the Invention

The present invention relates to an incident-light fluorescent illumination device and a fluorescent microscope using the device.

2. Description of the Related Art

Recently, in the field of an illumination device for a microscope, an illumination device provided with a fly-eye lens is proposed for a configuration of the conventional Koehler illumination.

Since a fly-eye lens can suppress the uneven illumination caused by the angle dependence (hereinafter referred to as light distribution angle characteristic) of the quantity of light emitted from a light source, which has been difficult in the conventional Koehler illumination, it effectively contributes to the improvement of the uniformity of illumination.

The illumination device of a microscope provided with a fly-eye lens is disclosed by, for example, Japanese Laid-open Patent Publication No. 2005-283879. The illumination device disclosed by Japanese Laid-open Patent Publication No. 2005-283879 is an incident-light fluorescent illumination device, and relays a plurality of light source images formed by the fly-eye lens (converging lens array) to the pupil position of an objective. That is, the position of the light source image and the pupil position of the objective have an optically conjugate relation, and realize the Koehler illumination. Thus, telecentric illumination can be realized, and the uniformity of illumination can be improved using the fly-eye lens.

In a microscope, the pupil position of an objective depends on various factors such as the switching of objectives etc. In the conventional illumination device, the conjugate relation between the position of a light source image and the pupil position can be maintained by moving the light source with a change of the pupil position.

On the other hand, in the case of the illumination device disclosed by Japanese Laid-open Patent Publication No. 2005-283879, since the positional relation between the light source and the fly-eye lens cannot be changed, the conjugate relation between the position of the light source image and the pupil position can be maintained by moving the entire optical system from the light source to the fly-eye lens.

By considering that the magnification at which the light source image formed by a fly-eye lens is projected onto the pupil position of the objective is lower than the magnification at which the light source is projected onto the pupil position of the objective by the conventional incident-light fluorescent illumination system without a fly-eye lens, the necessary amount of movement of an optical system to maintain the conjugate relation is larger than the amount of movement of the conventional light source.

Furthermore, the pupil position of an objective also depends on the configuration of the microscope provided with an illumination device in addition to the switching of an objective. The change of a pupil position caused by the difference in configuration of a microscope is larger than the change normally caused by the switching of objectives.

For example, when a microscope whose nose-piece (nose-piece) moves in the optical axis direction (hereinafter referred to as a moving-nose-piece microscope) is compared with a microscope whose stage moves (hereinafter referred to as a moving-stage microscope), the moving-nose-piece microscope is longer in distance from the light source to the pupil position of the objective. Since the moving-nose-piece microscope has to keep a sufficient distance between the stage and the objective by the movement of the nose-piece when a sample is put on the stage, it is necessary to provide space for saving the nose-piece on the light source side of the nose-piece. Since the length of the space in the optical axis is to be normally 1 through 1.5 times longer than the parfocalizing distance, the distance between the pupil position of the objective of moving-nose-piece microscope and that of the moving-stage microscope is 1 through 1.5 times longer than the parfocalizing distance. That is, by the difference in configuration of the microscope, there occurs a change in pupil position of the objective by 1 through 1.5 times longer than the parfocalizing distance.

SUMMARY OF THE INVENTION

An aspect of the present invention provides an incident-light fluorescent illumination device including: a light source emitting illumination light; a collector lens receiving the illumination light from the light source; a fly-eye lens optical system receiving the illumination light from the collector lens; an objective emitting the illumination light to the sample surface; and a relay optical system arranged between the fly-eye lens optical system and the objective. The fly-eye lens optical system includes a first fly-eye lens surface and a second fly-eye lens surface each having a plurality of lens elements. The device satisfies the following conditional expression.

$$0.3 \le D0/Lob \le 0.75$$

where D0 indicates the distance between the conjugate position with the second fly-eye lens surface through the relay optical system and the pupil position of the objective, and Lob indicates the parfocalizing distance of the objective.

BRIEF DESCRIPTION OF THE DRAWINGS

The present invention will be more apparent from the following detailed description when the accompanying drawings are referenced.

FIG. 2B is an explanatory view of another example of the illuminating state of a sample surface according to the conventional incident-light bright field illumination device;

FIG. 2C is an explanatory view of a further example of the illuminating state of a sample surface according to the conventional incident-light bright field illumination device;

FIG. 3B is an explanatory view of another example of the illuminating state of a sample surface according to the incident-light fluorescent illumination device of the embodiment 1;

FIG. 6A is an explanatory view of the operation of the fly-eye lens optical system included in the incident-light fluorescent illumination device according to the embodiment 2 when a light source image is smaller than the pitch of the fly-eye lens;

FIG. 7A is an explanatory view of the operation of the fly-eye lens optical system included in the incident-light fluorescent illumination device according to the embodiment 2 when a light source image is larger than the pitch of the fly-eye lens;

FIG. 8 is an explanatory view of the relationship between the numerical aperture of the illumination light entering the fly-eye lens optical system FL included in the incident-light fluorescent illumination device according to the embodiment 2 and the pitch P of the lens element; and FIG. 9 exemplifies a configuration of a variation example of the incident-light fluorescent illumination device according to the embodiment 2.

DESCRIPTION OF THE PREFERRED EMBODIMENTS

Figure 1A:
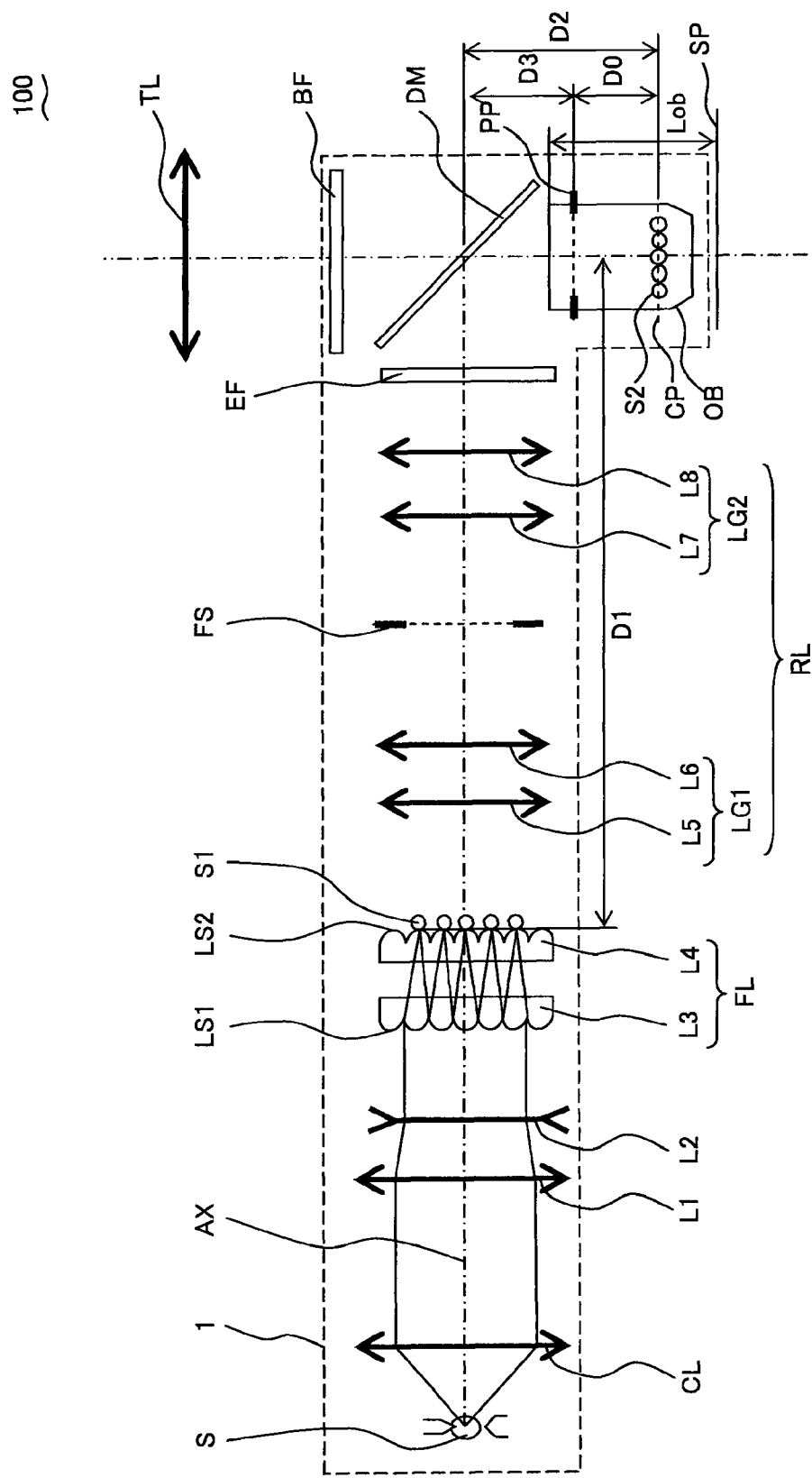
FIG. 1A exemplifies the configuration of a fluorescent microscope including the incident-light fluorescent illumination device according to the embodiment 1.

Each embodiment is described below with reference to the attached drawings.
<Embodiment 1>
FIG. 1A exemplifies the configuration of a fluorescent microscope including the incident-light fluorescent illumination device according to the present embodiment. FIG. 1B exemplifies the configuration of another fluorescent microscope including the incident-light fluorescent illumination device according to the present embodiment.

First, the configurations of a fluorescent microscope 100 exemplified in FIG. 1A, a fluorescent microscope 200 exemplified in FIG. 1B, and an incident-light fluorescent illumination device 1 according to the present embodiment are described below with reference to FIGS. 1A and 1B.

Each of the fluorescent microscope 100 and the fluorescent microscope 200 includes the incident-light fluorescent illumination device 1 which illuminates a sample surface SP by illumination light and a tube lens TL which forms an image from the fluorescence generated by the sample surface SP. The fluorescent microscope 100 and the fluorescent microscope 200 include the same incident-light fluorescent illumination device 1, but the attachment position of an objective OB included in the incident-light fluorescent illumination device 1 is different from each other.

Practically, the fluorescent microscope 100 is, for example, a moving-stage microscope, and the objective OB included in the incident-light fluorescent illumination device 1 is arranged at the position relatively close to a dichroic mirror DM included in the same incident-light fluorescent illumination device 1. On the other hand, the fluorescent microscope 200 is, for example, a moving-nose-piece microscope, and the objective OB is arranged in the position relatively separate from the dichroic mirror DM.

The incident-light fluorescent illumination device 1 according to the present embodiment includes a light source S emitting illumination light, a collector lens CL receiving the illumination light from the light source S, lenses L1 and L2, a fly-eye lens optical system FL receiving the illumination light from the collector lens CL, a relay optical system RL, a field stop FS, an excitation filter EF transmitting the illumination light of necessary wavelength for exciting a fluorescent substance, the dichroic mirror DM which reflects the illumination light functioning as excitation light and transmits fluorescence, a barrier filter BF transmitting the fluorescence, and the objective OB emitting the illumination light to the sample surface SP.

The light source S is, for example, an LED light source. An optical fiber light source can also be used as the light source S.

The fly-eye lens optical system FL includes a first fly-eye lens surface LS1 and a second fly-eye lens surface LS2 each including a plurality of lens elements.

To be more concrete, the fly-eye lens optical system FL includes, sequentially from the light source S side, a first fly-eye lens L3 having the first fly-eye lens surface LS1 on the light source S side and a plane on the sample surface SP side, and also having positive power, and a second fly-eye lens L4 having a plane on the light source S side and the second fly-eye lens surface LS2 on the sample surface SP side, and also having positive power.

It is preferable that the first fly-eye lens L3 and the second fly-eye lens L4 are of the same shape, and the lens element included in the first fly-eye lens surface LS1 is the same in pitch as the lens element included in the second fly-eye lens surface LS2.

The relay optical system RL is arranged between the fly-eye lens optical system FL and the objective OB. The relay optical system RL includes, sequentially from the light source S side, a first lens group provided with a lens L5 and a lens L6, and a second lens group provided with a lens L7 and a lens L8. The field stop FS is arranged between a first lens group LG1 and a second lens group LG2.

Although each of the first lens group LG1 and the second lens group LG2 is configured by two lenses, the present invention is not limited to this configuration. It is preferable that the first lens group LG1 includes at least one meniscus lens, entirely has positive power, and the lens at the side closest to the field stop FS has negative power. It is also preferable that the second lens group LG2 includes a lens having negative power, and entirely has positive power.

The relay optical system RL with the above-mentioned configuration can appropriately correct the astigmatism and the coma aberration indicating the off-axis aberration performance at the light source conjugate position. Therefore, a plurality of light source images formed by each element of the fly-eye lens are relayed by the relay optical system as light source conjugate images having even luminance and size at the conjugate positions. As a result, even illumination performance can be obtained. For more detail, the second lens group LG2 can include a lens having negative power, thereby appropriately correcting the spherical aberration and the chromatic aberration of a field stop image projected on the sample surface.

In addition, it is preferable that the first and second lens groups are configured without a jointed lens so that it can be prevented that the adhesive used for a jointed lens is degraded by the ultraviolet rays from the light source and that transmittance of the relay optical system RL degrades.

The dichroic mirror DM is arranged between the relay optical system RL and the objective OB.

The first fly-eye lens surface LS1 is at the front (object side) focal position of the objective OB, that is, conjugate with the sample surface SP. In addition, the field stop FS is also conjugate with the sample surface SP. The second fly-eye lens surface LS2 is at the back (object side) focal position of the fly-eye lens optical system FL.

Described next is the operations of the fluorescent microscope 100, the fluorescent microscope 200, and the incident-light fluorescent illumination device 1.

The illumination light emitted from the light source S such as a LED light source is converted into substantially parallel light by a collector lens CL, the diameter of the luminous flux is adjusted by the lenses L1 and L2, and the resultant light enters the fly-eye lens optical system FL as substantially parallel light.

The illumination light entering as the substantially parallel light is divided for each lens element through the first fly-eye lens surface LS1 (first fly-eye lens L3), and each ray of divided illumination light gathers near the second fly-eye lens surface LS2. Therefore, a plurality of light source images S1 are formed near the second fly-eye lens surface LS2.

Described below is an example of the case for simple explanation in which the light source image S1 is formed on the second fly-eye lens surface LS2, but the present invention is not limited to this example. The light source image S1 is only to be formed near the second fly-eye lens surface LS2

Each of the light source image S1 is formed by illumination light which is a part of the illumination light emitted from the light source S, and whose the emission angle from the light source S is in the respective and different ranges. For example, the light source image S1 formed on an optical axis AX is formed by the illumination light of a relatively small emission angle with the optical axis AX. On the other hand, the light source image S1 formed shifted from the optical axis AX is formed by the illumination light of a relatively large emission angle with the optical axis AX. Therefore, the light distribution angle characteristic of the light source S is divided, and the divided light distribution angle characteristic is taken over by each light source image S1.

Thus, each formed light source image S1 is relayed as a light source image S2 by the relay optical system RL to the position CP conjugate with the second fly-eye lens surface LS2 (hereinafter referred to simply as a conjugate position). Then, each light source image S2 illuminates the sample surface SP. That is, the illumination light from each light source image S2 having the divided light distribution angle characteristic is emitted to the sample surface SP by the objective OB, and overlaps on the sample surface SP. As a result, the unevenness of the illumination depending on the light distribution angle characteristic of the light source S is suppressed.

Figure 1B:
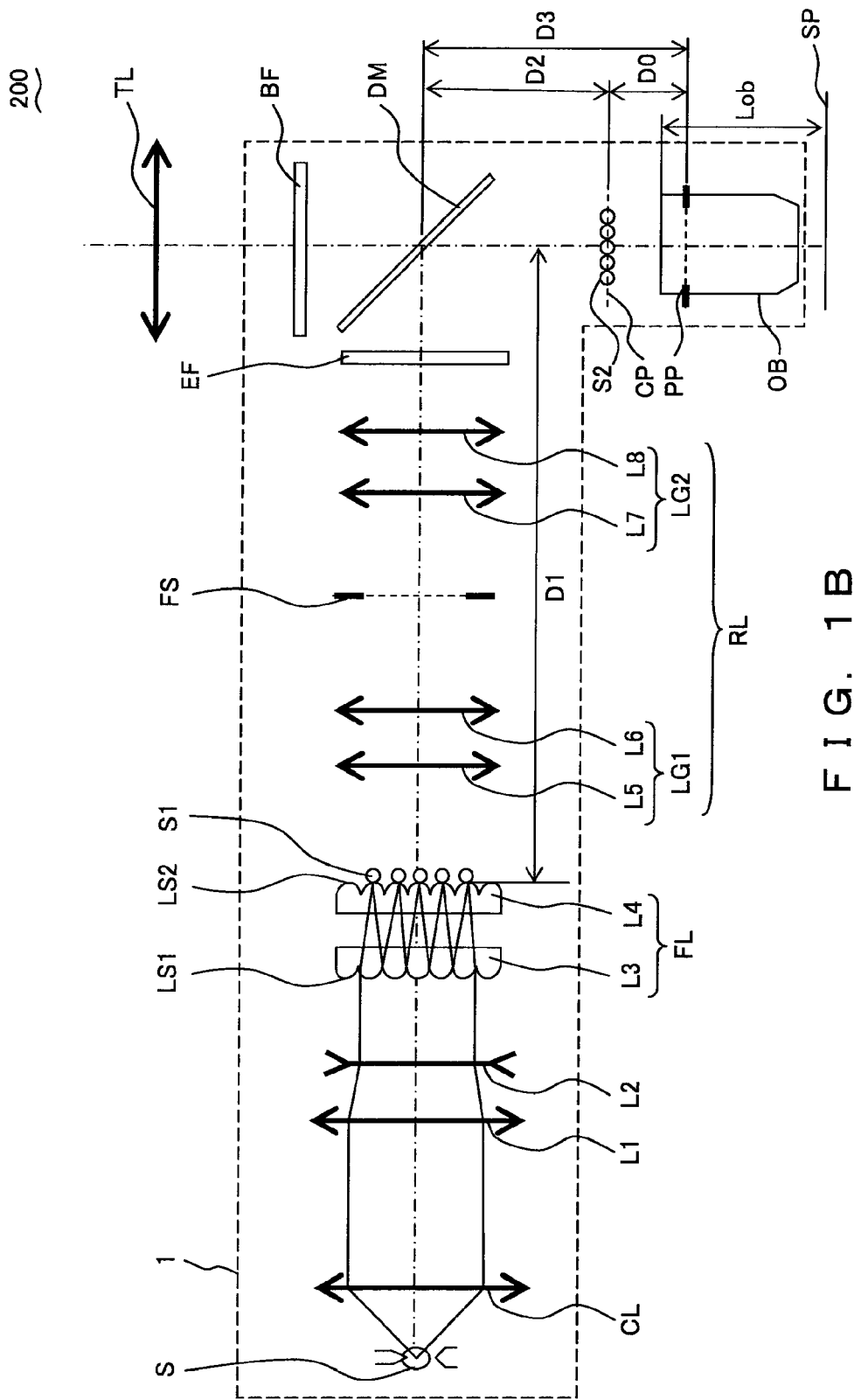
FIG. 1B exemplifies the configuration of another fluorescent microscope including the incident-light fluorescent illumination device according to the embodiment 1.

In the fluorescent microscope 100 illustrated in FIG. 1A, since the distance from the dichroic mirror DM to the objective OB is relatively short, the conjugate position CP is located at the sample surface SP side with respect to the pupil position PP of the objective. On the other hand, in the fluorescent microscope 200 illustrated in FIG. 1B, since the distance from the dichroic mirror DM to the objective OB is relatively long, the conjugate position CP is located at the light source S side with respect to the pupil position PP of the objective. Thus, by arranging the pupil position PP separate by a predetermined distance from the conjugate position CP, any of the fluorescent microscopes 100 and 200 can realize high illumination uniformity.

Described below is the incident-light fluorescent illumination device 1 and a fluorescent microscope provided with the incident-light fluorescent illumination device 1 realizing high illumination uniformity independent of the pupil position PP of the objective OB by arranging the pupil position PP separate from the conjugate position CP by a predetermined distance.

First, to clarify the characteristic of the incident-light fluorescent illumination device 1 according to the present invention, the conventional incident-light bright field fluorescent illumination device as a type of incident-light illumination device is briefly described below.

Figure 2A:
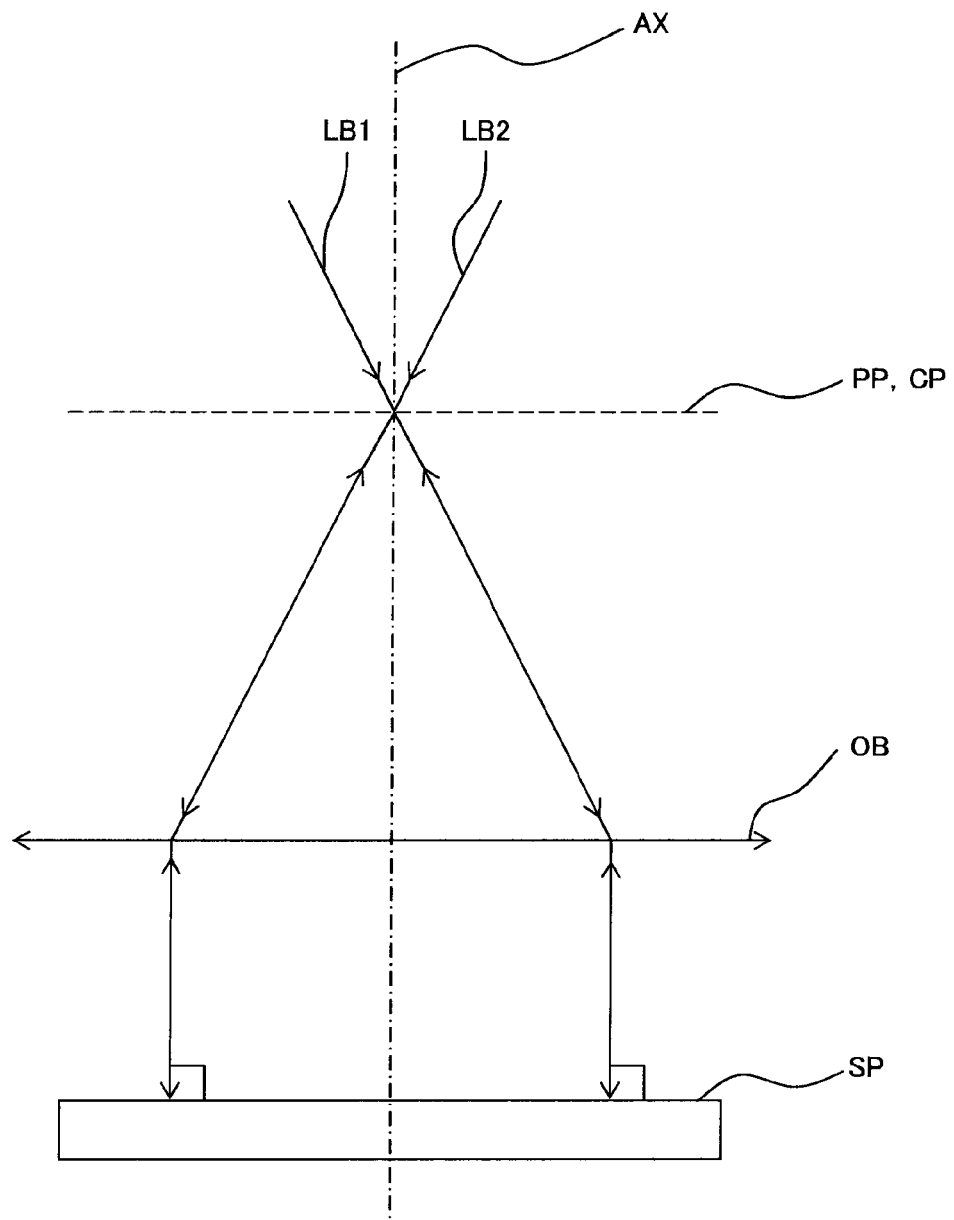
FIG. 2A is an explanatory view of an example of the illuminating state of a sample surface according to the conventional incident-light bright field illumination device.

FIGS. 2A, 2B, and 2C are explanatory views of an example of the illuminating state of the sample surface by the conventional incident-light bright field fluorescent illumination device. FIG. 2A exemplifies the incident-light illuminating state in which the Koehler illumination is realized. FIGS. 2B and 2C exemplify the illuminating state in which the Koehler illumination is not realized. The incident-light bright field illumination device is an illumination device used in the bright field microscope for observing the sample surface by the illumination light regularly reflected by the sample surface.

As exemplified in FIG. 2A, when the conjugate position CP matches the pupil position PP of the objective OB, the principal ray of the illumination light passing the pupil position PP is refracted by the objective OB, and enters the sample surface SP in parallel with the optical axis AX. Therefore, the reflected light regularly reflected by the sample surface SP is led to the observation optical system not illustrated in the attached drawings through the same optical path as the illumination light. Since it is the same process as the principal rays LB1 and LB2 at the most off-axis side which regulate the illumination range, the illumination range can be appropriately observed in the bright field illumination device with the configuration as illustrated in FIG. 2A.

On the other hand, as exemplified in FIGS. 2B and 2C, when the conjugate position CP does not match the pupil position PP of the objective OB, there can occur the state in which a sufficient range cannot be observed on the sample surface SP.

As exemplified in FIG. 2B, when the conjugate position CP is closer to the sample surface SP side than the pupil position PP, the principal rays LB1 and LB2 at the most off-axis side are refracted outside with respect to the optical axis AX by the objective OB. In this case, even in the case where a sufficient illumination range can be obtained, there can occur the state in which the illumination range cannot be sufficiently observed by the reflected light deviated outside the effective diameter of the objective OB.

In addition, as exemplified in 2C, when the conjugate position CP is closer to the light source side than the pupil position PP, the principal rays LB1 and LB2 at the most off-axis side are refracted inside with respect to the optical axis AX by the objective OB on the other hand in FIG. 2B. Therefore, the illumination range itself becomes smaller, and the state may occur in which the sufficient range cannot be observed on the sample surface SP. In addition, since the optical path of the reflected light is different from the optical path of the illumination light, there may occur the state in which the illumination range cannot be sufficiently observed due to the vignetting on the reflected light.

Thus, in the incident-light bright field illumination device, since it is assumed that the sample surface SP is observed by the reflected light regularly reflected by the sample surface SP, preferable is the Koehler illumination for illuminating the sample surface SP in parallel with the optical axis AX.

On the other hand, in the case of the incident-light fluorescent illumination device 1 according to the present embodiment, unlike the bright field illumination device, the Koehler illumination is not always required. On the fluorescent microscope provided with the incident-light fluorescent illumination device, not the reflected light reflected by the sample surface SP, but the fluorescence generated from the fluorescent substance existing on the sample surface SP is observed.

Figure 3A:
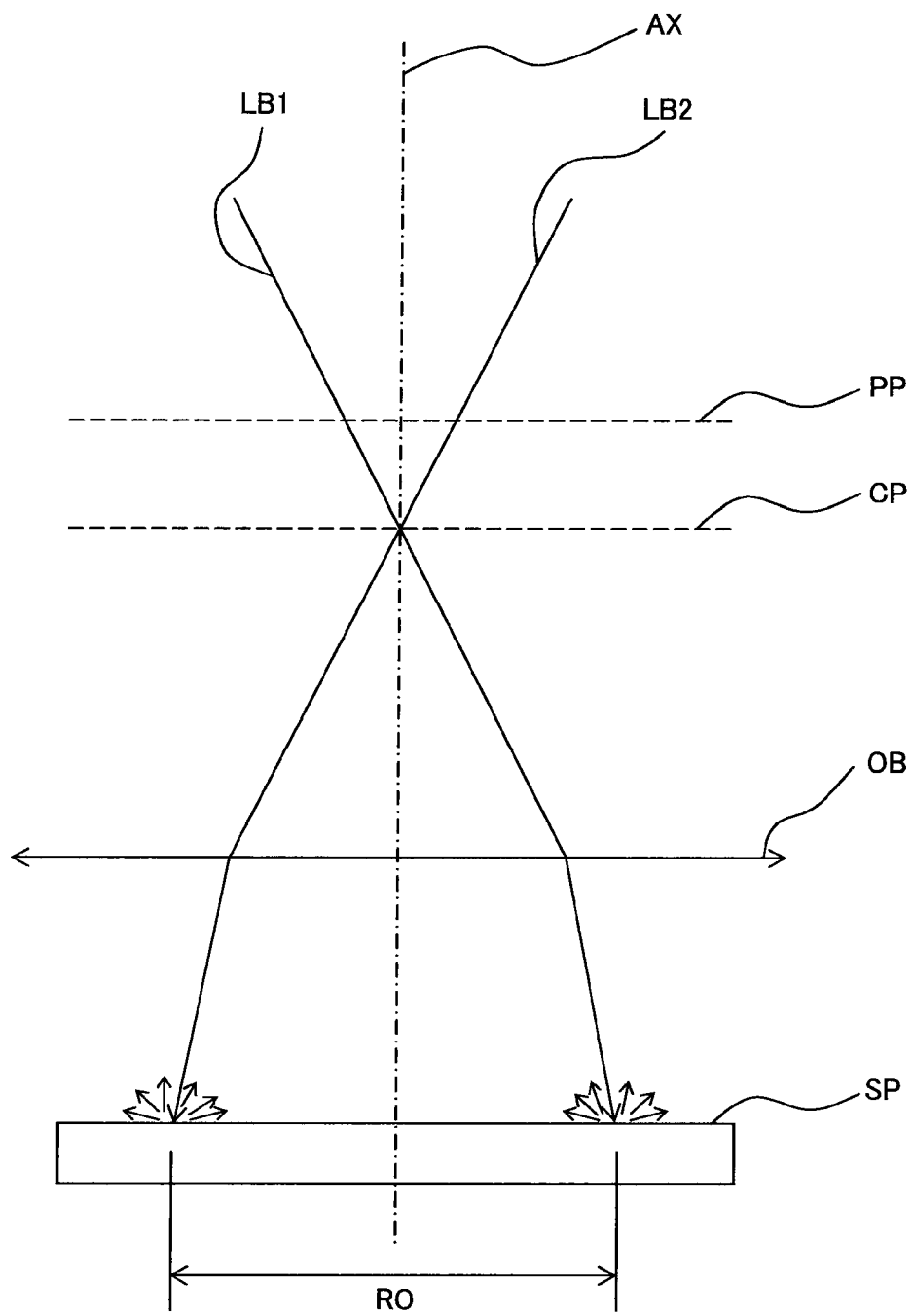
FIG. 3A is an explanatory view of an example of the illuminating state of a sample surface according to the incident-light fluorescent illumination device of the embodiment 1.

FIGS. 3A and 3B are explanatory views of an example of the illuminating state on the sample surface by the incident-light fluorescent illumination device 1 according to the present embodiment, and each figure exemplifies the illuminating state in which the Koehler illumination is not realized.

As exemplified in FIG. 3A, when the conjugate position CP is closer to the sample surface SP side than the pupil position PP, the principal rays LB1 and LB2 at the most off-axis side are refracted outside with respect to the optical axis AX by the objective OB. On the sample surface SP, the fluorescent substance is excited by the illumination light and fluorescence is generated, but the fluorescence is emitted in all directions independent of the incident angle of the illumination light. Therefore, independent of the incident angle, a predetermined rate of the fluorescence in the generated fluorescence enters the effective diameter of the objective OB. As a result, the illumination range R0 can be appropriately observed.

In addition, as exemplified in FIG. 3B, when the conjugate position CP is closer to the light source S side than the pupil position PP, the principal rays LB1 and LB2 at the most off-axis side are refracted inside with respect to the optical axis AX by the objective OB. Therefore, the illumination range itself becomes smaller, and the state may occur in which a sufficient range cannot be observed on the sample surface SP. Therefore, in the incident-light fluorescent illumination device 1 according to the present embodiment, the numerical aperture when the illumination light enters the conjugate position CP (hereinafter referred to as an incident numerical aperture) is designed in advance depending on the illumination range R0 of a preferable size. To be more concrete, the incident-light fluorescent illumination device 1 is designed so that an incident numerical aperture NA2 larger than an incident numerical aperture NA1 available when the conjugate position CP matches the pupil position PP (that is, in the Koehler illumination state) can be available. Thus, the illumination range R0 can be appropriately observed.

As described above, in the incident-light fluorescent illumination device, the degradation of the illumination performance generated when the Koehler illumination is not realized is smaller than in other incident-light illumination device such as a bright field illumination device etc. Therefore, it is not always necessary to match the pupil position PP and the conjugate position CP.

However, if the conjugate position CP is considerably separate from the pupil position PP, the illumination performance may be degraded by the vignetting on the illumination light.

Therefore, in the incident-light fluorescent illumination device 1 exemplified in FIGS. 1A and 1B, the conjugate position CP is set for the optimum position when the pupil position PP changes, which can be predicted, thereby realizing high illumination uniformity independent of the pupil position PP of the objective OB.

In the changes of the predicted pupil positions PP, the largest change can occur when the microscope using the incident-light fluorescent illumination device 1 changes from the moving-stage microscope to the moving-nose-piece microscope (and vice versa). Therefore, the conjugate position CP of the incident-light fluorescent illumination device 1 is arranged in the approximately intermediate position between the pupil position in the moving-stage microscope and the pupil position in the moving-nose-piece microscope. Since the amount of movement of the objective which can occur between the configurations of the microscopes above is about 1 through 1.5 times longer than the parfocalizing distance of the objective, the conjugate position CP of the incident-light fluorescent illumination device 1 is configured to satisfy the following conditional expressions in any fluorescent microscope.

$$0.3 \leq D0/Lob \leq 0.75 \tag{1}$$

where D0 indicates the distance between the conjugate position CP with the second fly-eye lens surface LS2 through the relay optical system RL and the pupil position PP of the objective OB, and Lob indicates the parfocalizing distance of the objective OB. The distance D0 is expressed by $D0=|D2-D3|$ where D2 indicates the distance from the dichroic mirror DM to the conjugate position CP, and D3 indicates the distance from the dichroic mirror DM to the pupil position PP. D2–D3 indicates a positive value with the moving-stage microscope, and a negative value with the moving-nose-piece microscope.

The conditional expression (1) regulates the distance between the conjugate position CP and the pupil position PP, and when it is considered that the light source image S2 is relayed to the vicinity of the conjugate position CP, the expression regulates the distance between the pupil position PP and the light source image S2. By satisfying the conditional expression (1), high uniformity of fluorescent illumination can be realized regardless of the pupil position PP of the objective OB especially regardless of the moving-stage microscope or the moving-nose-piece microscope.

When the upper limit of the conditional expression (1) is exceeded, the pupil position PP is considerably separate from the conjugate position CP, thereby causing the vignetting in the objective OB, failing in maintaining the necessary illumination range for an observation, and degrading the illumination uniformity. On the other hand, when the lower limit of the conditional expression (1) is not reached, high illumination uniformity can be realized with the currently available microscope (for example a moving-stage microscope), but the distance between the pupil position PP and the conjugate position CP is too long with the microscope having a different configuration (for example, a moving-nose-piece microscope), thereby generating vignetting and failing in maintaining illumination uniformity.

Thus, the incident-light fluorescent illumination device 1 according to the present embodiment is specifically designed for an incident-light fluorescent illumination device using the characteristic specific to the incident-light fluorescent illumination device in which the fluorescence to be detected is emitted in all directions independent of the incident angle of excitation light. With the configuration, an illumination device resistant to the fluctuation of the pupil position of an objective and having high illumination uniformity can be realized.

In addition, an objective OB used for the illumination device is normally used after selecting from among a plurality of objectives depending on the necessary observation magnification, but it is preferable that the incident-light fluorescent illumination device 1 satisfies the following conditional expressions.

$$0.6 < E \times \beta / DL < 1.2 \quad (2)$$

$$1 < DS/(\beta \times P) < 3 \quad (3)$$

$$2 \leq DL/DS \leq 5 \quad (4)$$

where DL indicates the pupil diameter of a first objective OB1 having the largest pupil diameter among the available objectives, DS indicates the pupil diameter of a second objective OB2 having the smallest pupil diameter among the objectives, P indicates the pitch of a lens element of the second fly-eye lens surface LS2 (fly-eye lens optical system FL), and E indicates the effective diameter of the second fly-eye lens L4 (fly-eye lens optical system FL).

Figure 4:
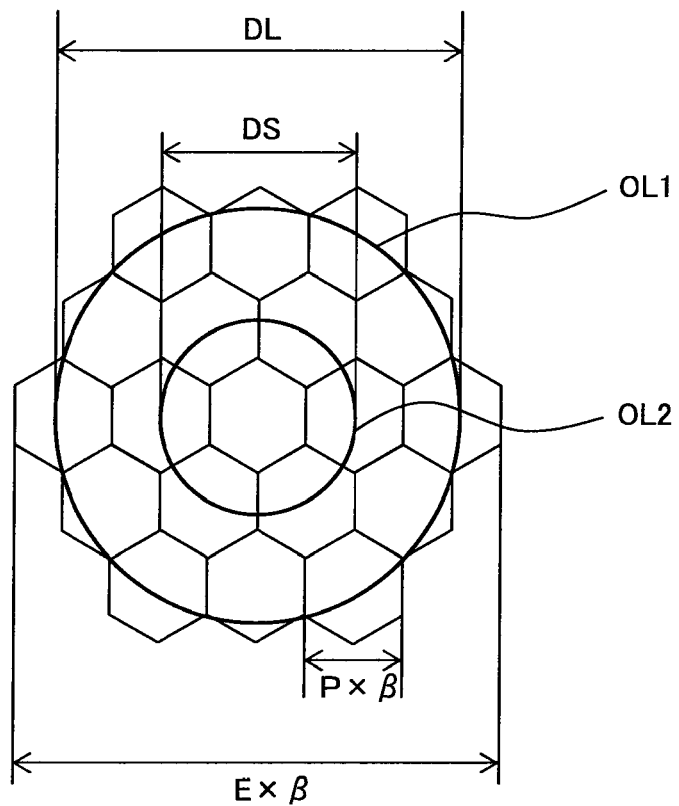
FIG. 4 exemplifies the relationship between the projected image of the fly-eye lens surface included in the incident-light fluorescent illumination device according to the embodiment 1 and the pupil of an objective.

FIG. 4 exemplifies the second fly-eye lens surface projected on the conjugate position CP. Since the second fly-eye lens surface LS2 is projected on the conjugate position CP by $\beta$ times, the effective diameter of the second fly-eye lens surface LS2 projected on the conjugate position CP is $E \times \beta$, and the pitch of the lens element of the second fly-eye lens surface LS2 projected on the conjugate position CP is $P \times \beta$.

The conditional expression (2) regulates the ratio of the size of the entire light source image S2 to the largest pupil diameter DL of the objective OB. The size of the entire light source image S2 is approximated as the effective diameter of the second fly-eye lens surface LS2 projected on the conjugate position CP. When the upper limit of the conditional expression (2) is exceeded, the excitation light passes the outside of the pupil of the objective OB, thereby reducing the illumination efficiency. On the other hand, when the lower limit is not reached, the luminance is insufficient.

The conditional expression (3) regulates the number of lens elements of the second fly-eye lens surface LS2 formed in the smallest pupil diameter DS of the objective OB. When the upper limit of the conditional expression (3) is exceeded, the number of lens elements working on the excitation light is large. Therefore, the loss of the excitation light generated at the boundary becomes large and the luminance of the illumination is reduced. On the other hand, when the lower limit of the conditional expression (3) is not reached, the number of divisions in the fly-eye lens optical system FL is small. Therefore, the illumination non-uniformity depending on the light distribution angle characteristic of the light source S cannot be effectively suppressed.

The conditional expression (4) regulates the ratio of the largest pupil diameter DL to the smallest pupil diameter DS of the objective OB. When the upper limit of the conditional expression (4) is exceeded, the pupil diameter of the objective of a high magnification becomes relatively smaller, and the numerical aperture becomes smaller relative to the magnification. Therefore, the luminance of the illumination is reduced. In addition, when the lower limit of the conditional expression (4) is not reached, the pupil diameter of the objective of a low magnification becomes relatively smaller, and the numerical aperture becomes smaller relative to the magnification. It is not preferable that the upper and lower limits are largely deviated because a fluorescent observation cannot be efficiently performed at low and high magnifications.

By satisfying the conditional expressions (2) through (4), better illumination performance can be realized independent of the magnifications of a plurality of objectives.

As described above, according to the present embodiment, an incident-light fluorescent illumination device using a fly-eye lens optical system and a fluorescent microscope provided with the illumination device can be provided for realizing high illumination uniformity although the pupil position of an objective changes.

In the description above, an example of changing the pupil position PP of the objective OB is described with the conjugate position CP fixed, but the present invention is not limited to this application. The incident-light fluorescent illumination device can include, for example, a plurality of illumination paths from each of a plurality of light sources to the same objective, and a fly-eye lens optical system to each of the illumination paths. In this case, although the conjugate position of each fly-eye lens optical system is different from each other, high illumination uniformity can be obtained as with the incident-light fluorescent illumination device 1 by satisfying the conditional expression (1) for the pupil position of an objective.

FIG. 4 illustrates an example in which the shape of a lens element of the fly-eye lens surface is hexagonal, but the present invention is not limited to this application. The lens element can be of any other shape. For example, it can be of rectangular or other polygonal shapes.

<Embodiment 2>

Figure 5:
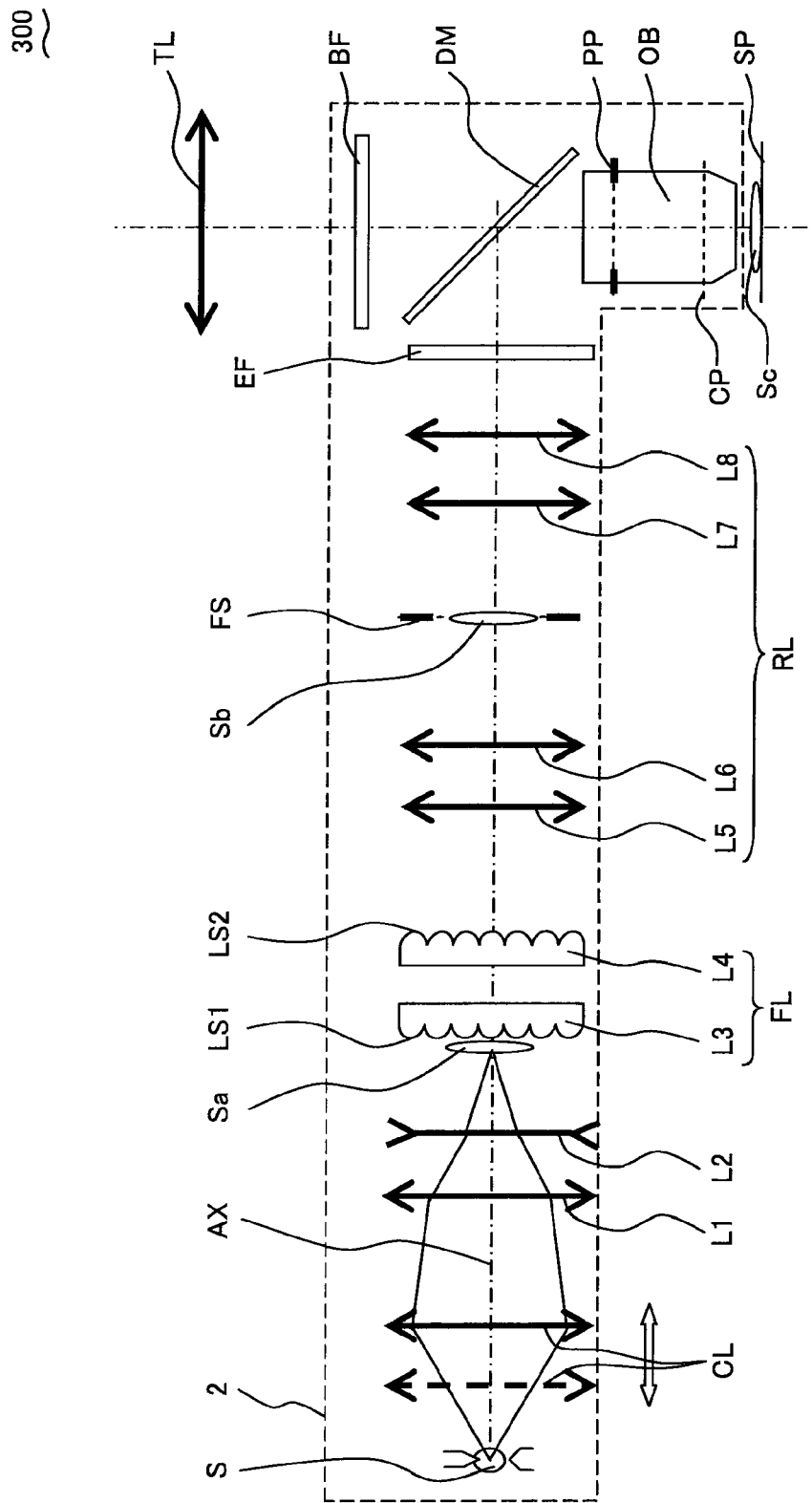
FIG. 5 exemplifies the configuration of a fluorescent microscope including the incident-light fluorescent illumination device according to the embodiment 2.

FIG. 5 exemplifies the configuration of a fluorescent microscope including the incident-light fluorescent illumination device according to the present embodiment. A fluorescent microscope 300 exemplified in FIG. 5 includes an incident-light fluorescent illumination device 2 which illuminates the sample surface SP by illumination light and a tube lens TL for forming an image from fluorescence captured by an objective OB. In this example, the fluorescent microscope 300 has a configuration in which the pupil position PP is arranged on the light source S with respect to the conjugate position CP, but the present invention is not limited to this application. That is, the pupil position PP can be arranged on the sample surface SP side with respect to the conjugate position CP.

The incident-light fluorescent illumination device 2 according to the present embodiment is similar to the incident-light fluorescent illumination device 1 according to the embodiment 1 except that the distance between the light source S and the collector lens CL is changed by moving the collector lens CL in the optical axis direction. Therefore, the same element as in the incident-light fluorescent illumination device 1 is assigned the same reference numeral, and the detailed explanation is omitted here.

The incident-light fluorescent illumination device 2 can switch between the first state in which a plurality of light source images S1 are formed near the second fly-eye lens surface LS2 and the second state in which a light source images Sa is formed near the first fly-eye lens surface LS1 by moving the collector lens CL which is a unit for changing the distance between the light source S and the collector lens CL. In the first state, the incident-light fluorescent illumination device 2 can realize high illumination uniformity as with the incident-light fluorescent illumination device 1 according to the embodiment 1. On the other hand, in the second state, the incident-light fluorescent illumination device 2 is inferior to that in the first state in illumination uniformity, but higher illumination uniformity can be realized than by the conventional Koehler illumination device without a fly-eye lens optical system, and higher luminance can be realized than in the first state.

Next, with reference to FIG. 5, the second state of the incident-light fluorescent illumination device 2 according to the present embodiment is described below. Since the first state is similar to the state realized by the incident-light fluorescent illumination device 1 according to the embodiment 1, the detailed explanation is omitted here.

In the second state, the illumination light emitted from the light source S is converted into converged light by the collector lens CL, and condenses near the first fly-eye lens surface LS1 of the first fly-eye lens L3 through the lenses L1 and L2. Thus, a single light source image Sa is formed near the first fly-eye lens surface LS1 where the illumination light has condensed.

Described below is the case as an example in which the light source image Sa is formed on the first fly-eye lens surface LS1 for simple explanation, but the present invention is not limited to this example. That is, the light source image Sa only has to be formed near the first fly-eye lens surface LS1.

The light source image Sa is relayed as a light source image Sb to the field stop FS by the fly-eye lens optical system FL and the first lens group LG1 (lenses L5 and L6) of the relay optical system RL. The light source image Sb is further relayed as a light source image Sc to the sample surface SP by the second lens group LG2 (lenses L7 and L8) of the relay optical system and the objective OB. Then, the light source image Sc illuminates the sample surface SP. Thus, since the second state of the incident-light fluorescent illumination device 2 is in the state of the critical illumination in which a light source image is formed on the sample surface SP, brighter illumination can be realized than the incident-light fluorescent illumination device 2 in the first state.

Figure 6B:
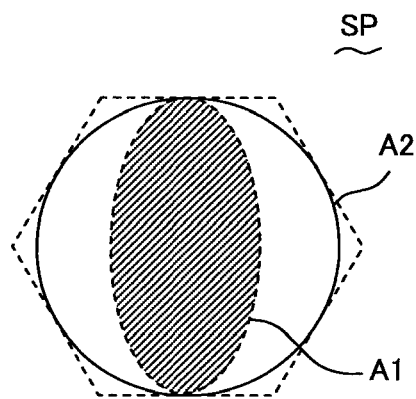
FIG. 6B is an explanatory view of the operation of the fly-eye lens optical system included in the incident-light fluorescent illumination device according to the embodiment 2 when a light source image is smaller than the pitch of the fly-eye lens.
Figure 7B:
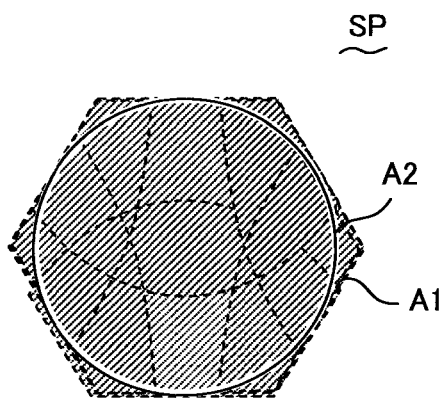
FIG. 7B is an explanatory view of the operation of the fly-eye lens optical system included in the incident-light fluorescent illumination device according to the embodiment 2 when a light source image is larger than the pitch of the fly-eye lens.

Described next is the operation of the fly-eye lens optical system FL in the second state. FIGS. 6A and 6B are explanatory views of the fly-eye lens optical system FL when the light source image Sa is smaller than the pitch P of the lens element of the first fly-eye lens surface LS1 (fly-eye lens optical system FL). FIGS. 7A and 7B explanatory views of the fly-eye lens optical system FL when the light source image Sa is larger than the pitch P of the lens element of the first fly-eye lens surface LS1 (fly-eye lens optical system FL). FIG. 8 is an explanatory view of the relationship between the numerical aperture of the illumination light entering the fly-eye lens optical system FL and the pitch P of the lens element.

As exemplified in FIG. 6A, when the light source image Sa is small, and is projected within one lens element, the illumination light emitted from the light source image Sa enters one lens element. Then, the illumination light reaches the sample surface SP without being divided by the fly-eye lens optical system FL. Therefore, as exemplified in FIG. 6B, since the luminance distribution of the light source image Sa is projected on the sample surface SP as is, the illumination uniformity is not good enough. In this case, since an illumination range A1 does not satisfy a field range (i.e. a range of field of view) A2, the illumination light does not illuminate the surrounding area of the field, and the surrounding area of the field is dark.

On the other hand, as exemplified in FIG. 7A, when the light source image Sa formed on the first fly-eye lens surface LS1 is larger than the pitch P of the lens element, the illumination light emitted from the light source image Sa enters a plurality of lens elements. Therefore, the illumination light is divided by the fly-eye lens optical system FL, and each ray of the divided illumination light reaches the sample surface SP. When the illumination light is divided, the luminance distribution of the light source S is also divided, and the divided luminance distribution is taken over by each ray of the illumination light. Therefore, as exemplified in FIG. 7B, the luminance distribution in the illumination range A1 on the sample surface SP is the luminance distribution obtained by superposing the divided luminance distribution, and improved in illumination uniformity as compared with the conventional critical illumination. In this case, since the illumination range A1 satisfies the field range A2, the illumination light illuminates the entire field.

As described above, in the second state in which the light source image Sa is formed on the first fly-eye lens surface LS1, the incident-light fluorescent illumination device 2 can realize higher illumination uniformity than the conventional critical illumination by a light source image Sa larger than the pitch P of the lens element of the first fly-eye lens surface LS1 (fly-eye lens optical system FL).

Therefore, it is preferable that the incident-light fluorescent illumination device 2 satisfies the following conditional expressions in the second state.

$$1.5 \leq H/P \leq 5 \quad (5)$$

$$0.5 \leq 2 \times F2 \times NA0/P \leq 1 \quad (6)$$

where H indicates the size of the light source image Sa formed near the first fly-eye lens surface LS1 in the second state, P indicates the pitch of the lens element of the first fly-eye lens surface LS1 (fly-eye lens optical system FL), NA0 indicates the numerical aperture of the illumination light entering the first fly-eye lens surface LS1, and F2 indicates the focal distance of the second fly-eye lens.

The conditional expression (5) regulates the ratio of the size H of the light source image Sa formed near the first fly-eye lens surface LS1 to the pitch P of the lens element of the first fly-eye lens surface LS1 (fly-eye lens optical system FL). When the upper limit of the conditional expression (5) is exceeded, the pitch P becomes small, thereby increasing the loss at the boundary of the fly-eye lens. As a result, the luminance decreases. On the other hand, when the lower limit of the conditional expression (5) is not reached, the number of divisions of the illumination light in the fly-eye lens optical system FL is small. Therefore, the luminance distribution of the light source is not sufficiently divided, and the illumination uniformity can not be effectively improved.

The conditional expression (6) regulates the ratio of the luminous flux diameter of the illumination light emitted from each lens element to the pitch P of the lens element of the fly-eye lens optical system FL. As understood with reference to FIG. 8, if the upper limit of the conditional expression (6) is exceeded, then a part of the illumination light emitted from the lens element of the first fly-eye lens L3 cannot enter the corresponding lens element of the second fly-eye lens L4, and there occurs a loss of the quantity of light, thereby reducing the illumination intensity. On the other hand, as understood with reference to FIG. 8, if the lower limit of the conditional expression (6) is not reached, the luminous flux diameter of the illumination light emitted from each lens element of the second fly-eye lens L4 becomes smaller than the pitch P. Therefore, the area in the lens element cannot be fully used, and the illumination performance is reduced.

By satisfying the conditional expressions (5) and (6), the reduction of the illumination uniformity as compared with the first state can be minimized in the second state, and the illumination brighter than in the first state can be realized.

As described above, the present embodiment can provide, as with the embodiment 1, an incident-light fluorescent illumination device using a fly-eye lens optical system and a fluorescent microscope provided with the illumination device capable of realizing high illumination uniformity although the pupil position of an objective changes. In addition, the present embodiment can adjust the balance between the illumination uniformity and the luminance of the illumination light depending on the necessary illumination performance by switching between the first and second states by moving the collector lens CL.

In the present embodiment, the shape of the lens element of a fly-eye lens cannot be specifically limited. In addition to the hexagonal shape exemplified in FIGS. 6A, 6B, 7A, and 7B, for example, rectangular and other polygonal shapes can be applied.

FIG. 9 exemplifies a configuration of a variation example of the incident-light fluorescent illumination device according to the present embodiment. An incident-light fluorescent illumination device 3 exemplified in FIG. 9 is similar to the incident-light fluorescent illumination device 2 according to the embodiment 2 except that the distance between the light source S and the collector lens CL changes by moving the light source S in the optical axis direction.

The incident-light fluorescent illumination device 3 can switch between the first state in which a plurality of light source images S1 are formed near the second fly-eye lens surface LS2 and the second state in which the light source image Sa is formed near the first fly-eye lens surface LS1 by moving the light source S as a unit for changing the distance between the light source S and the collector lens CL.

As described above, according to the present variation example, the effect like the embodiment 2 can be obtained. That is, an incident-light fluorescent illumination device using a fly-eye lens optical system and a fluorescent microscope provided with the illumination device capable of realizing high illumination uniformity although the pupil position of an objective changes can be provided. In addition, the balance between the illumination uniformity and the luminance of illumination light can be adjusted depending on the necessary illumination performance by switching between the first and second states by moving the light source S.

What is claimed is:

1. An incident-light fluorescent illumination device comprising:
    a light source emitting illumination light;
    a collector lens receiving the illumination light from the light source;
    a fly-eye lens optical system receiving the illumination light from the collector lens;
    an objective emitting the illumination light to a sample surface; and
    a relay optical system arranged between the fly-eye lens optical system and the objective,
    wherein:
    the fly-eye lens optical system comprises a first fly-eye lens surface and a second fly-eye lens surface each having a plurality of lens elements; and
    a conditional expression of $0.3 \leq D0/Lob \leq 0.75$ is satisfied where: D0 indicates a distance between a conjugate position with the second fly-eye lens surface through the relay optical system and a pupil position of the objective, and Lob indicates a parfocalizing distance of the objective.

2. The device according to claim 1, wherein:
    the first fly-eye lens surface is conjugate with a front focal position of the objective; and
    the second fly-eye lens surface is located at a back focal position of the fly-eye lens optical system.

3. The device according to claim 2, wherein:
    the collector lens converts the illumination light into substantially parallel light; and
    the relay optical system relays an image S1 of the light source, formed near the second fly-eye lens surface, to close to the conjugate position with the second fly-eye lens surface.

4. The device according to claim 1, further comprising a field stop, wherein:
    the relay optical system comprises sequentially from the light source side:
        a first lens group comprising at least one meniscus lens, and having positive power entirely; and
        a second lens group comprising a lens having negative power, and having positive power entirely;
    the field stop is arranged between the first lens group and the second lens group and at a conjugate position with the sample surface;
    the first lens group comprises a lens having negative power at a position closest to the field stop.

5. The device according to claim 1, wherein:
    the objective is selected from among a plurality of objectives including a first objective having a largest pupil diameter and a second objective having a smallest pupil diameter; and
    conditional expressions of $0.6 < E \times \beta/DL < 1.2$ $1 < DS/(\beta \times P) < 3$ $2 \leq DL/DS \leq 5$ are satisfied where: $\beta$ indicates a projection magnification at which the second fly-eye lens surface is projected onto the conjugate position with the second fly-eye lens surface; DL indicates a pupil diameter of the first objective; DS indicates a pupil diameter of the second objective; P indicates a pitch of the lens element of the second fly-eye lens surface; and E indicates an effective diameter of the second fly-eye lens.

6. The device according to claim 1, further comprising a switch unit for switching between a first state in which a plurality of images of the light source near the second fly-eye lens surface are formed and a second state in which an image of the light source near the first fly-eye lens surface is formed.

7. The device according to claim 6, wherein the switch unit changes a distance between the light source and the collector lens.

8. The device according to claim 6, wherein:
    the fly-eye lens optical system comprises sequentially from the light source side:
        a first fly-eye lens comprising the first fly-eye lens surface and having positive power; and
        a second fly-eye lens comprising the second fly-eye lens surface and having positive power; and
    conditional expressions of $1.5 \leq H/P \leq 5$ $0.5 \leq 2 \times F2 \times NA0/P \leq 1$ are satisfied where: H indicates a size of an image of the light source formed near the first fly-eye lens surface in the second state; P indicates a pitch of the lens element of the first fly-eye lens surface, NA0 indicates a numerical aperture of the illumination light entering the first fly-eye lens surface; and F2 indicates a focal distance of the second fly-eye lens.

9. A fluorescent microscope comprising the incident-light fluorescent illumination device according to claim 1.

* * * * *